(12) United States Patent
Imbruce et al.

(10) Patent No.: US 12,086,503 B2
(45) Date of Patent: Sep. 10, 2024

(54) AUDIO SEGMENT RECOMMENDATION

(71) Applicant: Spotify AB, Stockholm (SE)

(72) Inventors: Doug Imbruce, New York, NY (US); Diego Fernando Lorenzo Casabuena Gonzalez, Brooklyn, NY (US); Oluseye Ojumu, Brooklyn, NY (US)

(73) Assignee: Spotify AB, Stockholm (SE)

(*) Notice: Subject to any disclaimer, the term of this patent is extended or adjusted under 35 U.S.C. 154(b) by 0 days.

(21) Appl. No.: 18/163,133

(22) Filed: Feb. 1, 2023

(65) Prior Publication Data
US 2023/0280966 A1    Sep. 7, 2023

Related U.S. Application Data

(63) Continuation of application No. 17/103,758, filed on Nov. 24, 2020, now Pat. No. 11,609,738.

(51) Int. Cl.
| | | |
|---|---|---|
| *G06F 3/16* | (2006.01) | |
| *G06F 3/14* | (2006.01) | |
| *G06F 16/635* | (2019.01) | |
| *G06F 16/638* | (2019.01) | |
| *G06F 16/64* | (2019.01) | |

(Continued)

(52) U.S. Cl.
CPC ............... *G06F 3/165* (2013.01); *G06F 3/14* (2013.01); *G06F 16/635* (2019.01); *G06F 16/638* (2019.01); *G06F 16/64* (2019.01); *G06N 5/04* (2013.01); *G06N 20/00* (2019.01); *G10L 17/00* (2013.01); *G10L 25/51* (2013.01)

(58) Field of Classification Search
CPC ........ G06F 3/165; G06F 16/638; G06F 16/64; G06F 16/635; G06F 3/14; G06N 20/00; G06N 5/04; G10L 17/00; G10L 25/51
See application file for complete search history.

(56) References Cited

U.S. PATENT DOCUMENTS

| 10,945,040 B1 | 3/2021 | Bedi et al. |
|---|---|---|
| 11,451,598 B1 * | 9/2022 | Chawla ................. G06F 16/735 |

(Continued)

FOREIGN PATENT DOCUMENTS

EP        3627505 A1    3/2020

OTHER PUBLICATIONS

Imbruce, Office Action, U.S. Appl. No. 17/103,758, Jun. 8, 2022, 17 pgs.

(Continued)

*Primary Examiner* — Fan S Tsang
*Assistant Examiner* — David Siegel
(74) *Attorney, Agent, or Firm* — Morgan, Lewis & Bockius LLP

(57) ABSTRACT

Media content episodes are received. Using machine learning, one or more media segments of interest are identified in each of the media content episodes based at least in part on an analysis of content included in a corresponding audio content episode. Each of the identified media segments is associated with one or more automatically determined tags. Using machine learning, a recommended media segment is selected for a specific user from the identified media segments based at least in part on attributes of the specific user and the automatically determined tags of the identified media segments. The recommended media segment is automatically provided in an media segment feed.

20 Claims, 9 Drawing Sheets

(51) Int. Cl.
  *G06N 5/04*     (2023.01)
  *G06N 20/00*    (2019.01)
  *G10L 17/00*    (2013.01)
  *G10L 25/51*    (2013.01)

(56) References Cited

U.S. PATENT DOCUMENTS

| | | |
|---|---|---|
| 2002/0049974 A1 | 4/2002 | Shinier |
| 2005/0182627 A1 | 8/2005 | Tanaka et al. |
| 2008/0066136 A1 | 3/2008 | Dorai et al. |
| 2013/0204825 A1 | 8/2013 | Su |
| 2014/0149326 A1 | 5/2014 | Kalmes et al. |
| 2015/0058016 A1 | 2/2015 | Goldstein |
| 2016/0275952 A1 | 9/2016 | Kashtan et al. |
| 2017/0048282 A1 | 2/2017 | Dharmai |
| 2017/0238043 A1* | 8/2017 | Zvinakis ............... G06F 3/0484 725/38 |
| 2018/0063556 A1 | 3/2018 | Kalmanson et al. |
| 2018/0139412 A1 | 5/2018 | Kiraz et al. |
| 2020/0013380 A1* | 1/2020 | Kakoyiannis ........ G10H 1/0008 |
| 2020/0105274 A1* | 4/2020 | Joller .................... G06F 16/638 |
| 2020/0219517 A1 | 7/2020 | Wang et al. |
| 2021/0044640 A1 | 2/2021 | He |
| 2021/0321165 A1 | 10/2021 | Yasir |
| 2022/0020376 A1* | 1/2022 | Garg ..................... G06F 40/216 |
| 2022/0050872 A1 | 2/2022 | Adlersberg et al. |

OTHER PUBLICATIONS

Imbruce, Notice of Allowance, U.S. Appl. No. 17/103,758, Oct. 26, 2022, 9 pgs.

LawTo, A Scalable Video Search Engine Based on Audio Content Indexing and Topic Segmentation, European Institute for Research and Strategic Studies in Telecommunications, 2011 Networked and Electreonic Medio (NEM) Summit, Sep. 2011, Torino, Italy, 6 pgs.

YouNow, "Fans can join broadcasters live at YouNow," date: Oct. 20, 2014, from https://www.prnewswire.com/news-releases/fans-can-join-broadcasters-live-at-younow-300162694.htm, 2 pgs.

* cited by examiner

AUDIO SEGMENT RECOMMENDATION

RELATED APPLICATION

This application is a continuation of U.S. patent application Ser. No. 17/103,758, filed Nov. 24, 2020, entitled "AUDIO SEGMENT RECOMMENDATION," which is incorporated herein by reference in its entirety.

BACKGROUND OF THE INVENTION

Podcasts are a medium for broadcasting audio content. Typically, users subscribe to a podcast show (also known simply as a podcast) to access podcast audio content episodes produced by audio content publishers. Often a user subscribed to a podcast show will receive new episodes as they are made available. The length of each podcast audio content episode can be different, such as minutes or hours long. Once an episode is published, users can access the episode to play the published audio content. A published audio content episode can be consumed on a variety of different devices and typically requires the capability to download and play digital audio. Common devices for playing podcast audio content episodes include mobile phones and computers. Although an episode is available for playing once it is published, the playback of the episode can be performed on demand and at the user's convenience irrespective of its publication date or the play progress of other users. Moreover, once a user has begun playing a specific episode, they can typically pause the episode and resume its playing at a later time when convenient.

BRIEF DESCRIPTION OF THE DRAWINGS

Various embodiments of the invention are disclosed in the following detailed description and the accompanying drawings.

DETAILED DESCRIPTION

Figure 1:
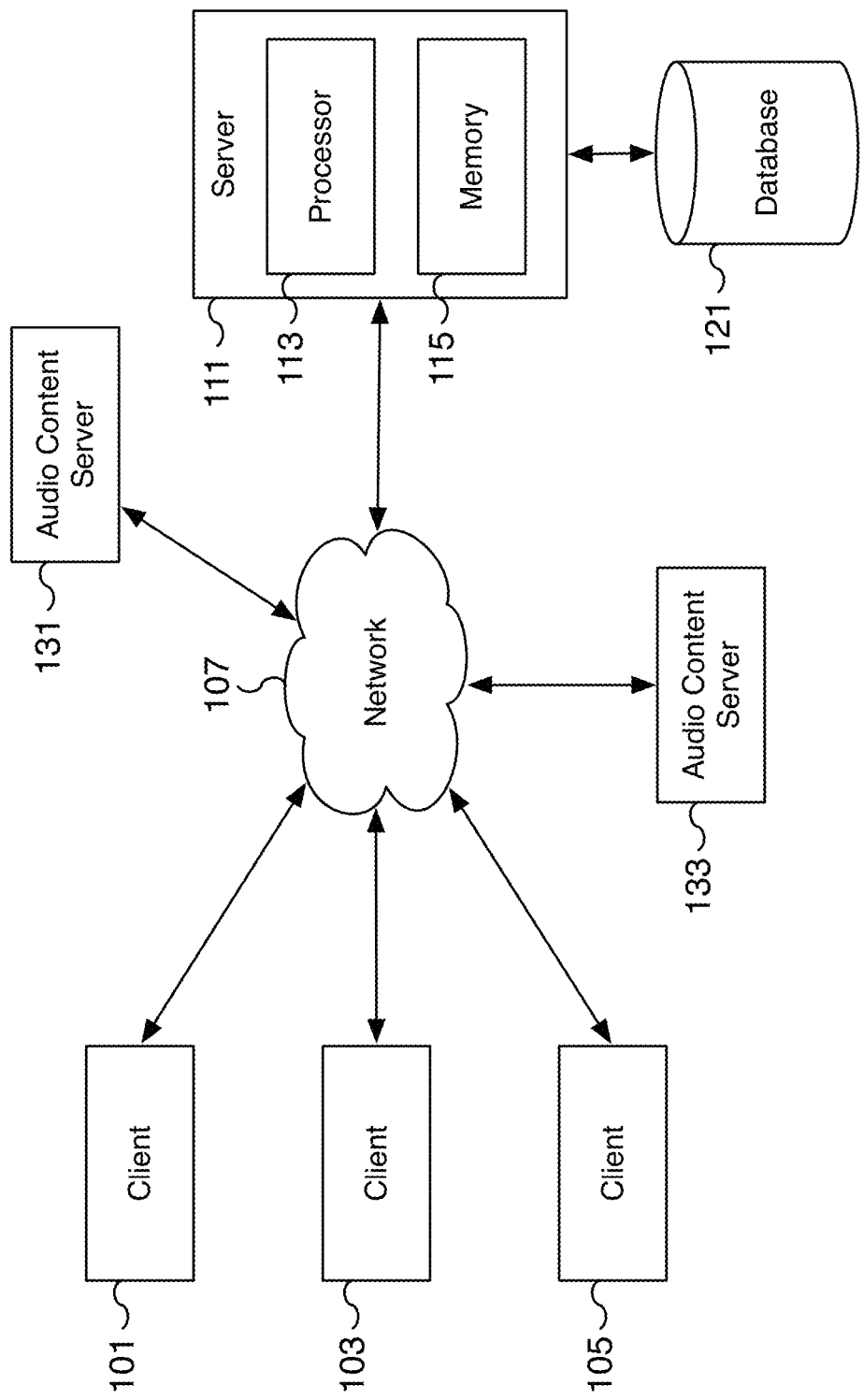
FIG. 1 is a block diagram illustrating an example of a network environment for creating and recommending audio segments from audio content episodes.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The segmentation of audio content for recommendations is disclosed. For example, an audio content episode such as a podcast episode, corresponding audio from a video, or audio from a live episode stream, etc., is analyzed to identify relevant audio segments. The audio segments are identified by analyzing the content of an episode for characteristics such as topics, speakers, duration, music, and advertisements, among others. In some embodiments, the analysis detects multiple content signals in each audio content episode, where each content signal possibly detects a different characteristic or property of the content. Based on the detected content signals, portions or clips of the audio content episode are identified to create one or more audio segments. The audio segments are trimmed portions of the audio content episode that are smaller and more easily consumed. In various embodiments, the start and end of an identified audio segment are selected to highlight a particularly relevant and/or interesting portion of the audio content episode. For example, an audio content episode may be 30 minutes to several hours long whereas the identified audio segments may each have a duration closer to 30 seconds to 2 minutes long. In some embodiments, the audio content episode can be analyzed to identify audio segments featuring only a single speaker with few interruptions. As another example, the identified audio segments can be selected such that the segment only covers a single discussion topic rather than jumping between multiple topics in a short time span. In some embodiments, the identified audio segments filter out advertisements and/or background music.

In various embodiments, each audio segment is automatically tagged. The automatically determined tags are used to categorize, recommend, and/or describe the identified audio segment. The tags can include internal tags that are only used for analysis as well as external tags, such as topic, category, and/or speaker tags, etc. that are surfaced to users.

For example, an audio segment for an entertainment audio content episode featuring Jane Doe can be tagged with the external tags @janedoe and #entertainment that are presented to users. In some embodiments, the tags are used for content discovery and/or determining episode recommendations for users. Once identified, particular audio segments can be selected and recommended to users, for example, by including recommended audio segments in a segment feed. In various embodiments, a segment feed allows a user to navigate through different recommended audio segments, playing each segment to completion or skipping through to the next recommended segment. The segment feed can also allow a user to quickly access and listen to the corresponding audio content episode of a recommended audio segment and/or designate the corresponding audio content episode for later listening. In some embodiments, the audio segment feed allows a user to automatically play, in a continuous manner, one audio segment after another. For example, once a first audio segment has finished playing, a second audio segment immediately begins playing. In some embodiments, the automatic transition between audio segments may include an automatic fade-out and/or fade-in sequence and/or another audio and/or video indicator. In various embodiments, as an audio segment plays, a corresponding visual indicator for the current playing audio segment is displayed. The visual indicator can include information of the current audio segment and corresponding audio content episode such as the name of the episode, topics covered, speaker information, length, and publication date, among other properties. In some embodiments, additional visual indicators for queued and/or previously played audio segments are displayed along with the visual indicator of the current audio segment of the audio segment feed. As the current audio segment plays, a user can simultaneously navigate the audio segment feed to inspect what audio segments are included in the feed. In some embodiments, a user can also reorder audio segments, jump directly to a specific audio segment, remove an audio segment, mark an audio segment for additional actions, and otherwise navigate and interact with the audio segments in the audio segment feed. In various embodiments, an audio segment feed can be created for a specific user or group of users based on user preferences and/or interests, among other factors. Different audio segment feeds can also be created for each user for different purposes, such as a daily feed, a news feed, an entertainment feed, a sports feed, a commute feed, etc.

In some embodiments, audio content episodes are received. For example, podcast audio episodes are collected and received for processing. As another example, the audio content from one or more videos is received for processing. In various embodiments, the audio content episodes can include both pre-recorded and live episodes. For example, a received audio content episode can correspond to a live audio stream. One or more audio segments of interest in each of the audio content episodes are identified using machine learning. For example, in some embodiments, machine learning is used to identify relevant audio segments or audio clips from each of the received audio content episodes. The clips identified are ones that are particularly relevant to listeners. They may be some of the more interesting portions of the audio content episodes and/or each identified audio segment may feature an extended discussion of a topic featured in the corresponding audio content episode. In some embodiments, the machine learning used to identify an audio segment of interest in each of the audio content episodes is based at least in part on an analysis of content included in the corresponding audio content episode. For example, the content of the audio content episodes can be analyzed by applying multiple machine learning models. The models can identify topics of discussion as well as speakers, advertisements, music, and other content signals within an audio content episode. Multiple machine learning models may be applied to identify different characteristics of the audio content. In some embodiments, the results of different machine learning models are merged, for example, by applying one or more heuristics such as identifying positive signals as well as negative avoidance signals. Positive signals can be used to identify portions of the audio content that are relevant and should be featured as an audio segment while avoidance signals can be used to identify portions to avoid highlighting. In some embodiments, machine learning is applied to the audio of the received audio content episodes and/or to one or more transformed versions of the audio content episodes such as a transcription or frequency transform. In some embodiments, identified audio segments can be selected based on the machine learning results from analyzing an audio content episode. Each of the identified audio segments is associated with one or more automatically determined tags. For example, content descriptive tags such as topic tags, speaker tags, category tags, etc. are associated with each identified audio segment. The tags can include both internal tags that are only used for analysis as well as external tags, such as topic, category, and/or speaker tags, etc. that are surfaced and presented to users. External tags may be more generalized whereas internal tags may include granular details describing specific portions of an episode including individual words and/or phrases of the audio content.

In some embodiments, machine learning is further used to select for a specific user a recommended audio segment from the identified audio segments. For example, one or more machine learning models are used to select an identified audio segment for a particular user. The selection can be determined by first ranking the identified audio segments and selecting the best ranked segment. In various embodiments, the audio segment is selected as a recommendation to a specific user. In some embodiments, a selected recommended audio segment is based at least in part on attributes of the specific user and the automatically determined tags of the identified audio segments. For example, a user's attributes may include a set of defined and/or inferred interests. The automatically determined tags for the identified audio segments can be used to match the identified audio segments to a user's interests. In various embodiments, the recommended audio segments are selected to match a user's interest or expected interest. In some embodiments, the recommended audio segment is automatically provided in an audio segment feed. For example, an audio segment feed for a specific user includes recommended audio segments from different audio content episodes for that specific user. Each specific user can quickly explore different audio content episodes by reviewing the user's audio segment feed. For example, a user can explore available audio content episodes by navigating through the user's audio segment feed and consuming recommended audio segments. The audio segment feed can be used to present recommended audio segments of different audio content episodes in a continuous manner. After an audio segment finishes playing, the next recommended audio segment can be automatically played without any user intervention. In various embodiments, a user can navigate between recommended audio segments and is presented with descriptions of each audio segment and corresponding audio content episode of the audio segment feed.

In various embodiments, a recommended audio segment provides the user with a preview of the corresponding audio content episode and allows the user to quickly determine what content to consume in the future. For example, a user can switch to listening to or mark for future listening to an audio content episode after first listening to the corresponding recommended audio segment of the episode included in their audio segment feed. As another example, in response to a recommended audio segment in their audio segment feed, a user can choose to ignore the corresponding audio content episode and skip to the next recommended audio segment in their audio segment feed. By including recommended audio segments from different audio content episodes, the audio segment feed allows a user to quickly explore different audio content episodes to identify which episodes to listen to. In various embodiments, future recommendations of audio segments can take into account the user's behavior and interaction with their audio segment feed and the included recommended audio segments.

In some embodiments, a highlight video clip is created based on a recommended audio segment. The highlight video clip includes the audio of the recommended audio segment and can be provided as shareable content with a reference to the corresponding content episode and/or uploaded for hosting at a variety of different content media providers, including video content distributors. For example, a highlight video clip that includes the recommended audio segment can be shared via email, social media, or other mediums to introduce users to the corresponding content episode. Since the recommended audio segment is a highlight of the audio (or video) content episode, playing of the highlight video clip provides users with a preview/excerpt of the full content episode. In various embodiments, the video portions of the highlight video clip include visual indictors of the audio segment and/or corresponding content episode. For example, the video clip can include the name of the episode, speakers of the episode, subtitles and speaker information synchronized for playing with the recommended audio segment, tags corresponding to the audio segment and/or episode, a reference to the corresponding episode, references to related content episodes or audio segments, and/or a reference to content applications and/or platforms for playing the corresponding episode, among other related information. In the event the recommended audio segment is extracted from a video content episode, the highlight video clip can include both the recommended audio segment as well as the corresponding video segment from the video content episode. In some embodiments, the highlight video clip includes multiple recommended audio segments extracted from the same audio or video content episode. For example, the highlight video clip can include three of the top recommended audio segments of an audio content episode. The highlight video clip can also include multiple recommended audio segments extracted from different episodes of the same show, such as a podcast show or video show. For example, three recommended audio segments (and corresponding video portions) are selected from episodes of a podcast show to highlight to users the podcast show rather than an individual episode of the show. Similarly, the recommended audio segments can be extracted from different podcast shows and content media (such as videos) to introduce users to the associated content, related content, and/or content platform.

In various embodiments, content publishers can utilize the disclosed techniques to extract highlighted portions of their content. For content episodes that have long runtimes, the ability to efficiently identify recommended segments from an episode allows a publisher to provide an easily consumed preview or excerpt of the episode to users. The recommended segments can include references to access, play, and/or retrieve the associated content. For example, a highlight webpage can be created that includes one or more highlight video clips and/or recommended audio segments. The highlight webpage can be shared via email, social media, or other mediums. The highlight webpage allows users to preview the associated content along with additional information and/or metadata identified by analyzing the content such as topic tags, speaker tags, subtitles, episode lists, related episodes such as episodes of other shows that include the same or similar topics and/or speakers, and the ability to retrieve and/or subscribe to the episode, among other actions. Although described with respect to audio content, the disclosed techniques are applicable to analyzing video content as well. By analyzing the audio content of a video, the identified recommended audio segments corresponding to recommended video segments of the full video. The recommended audio segments can be shared as highlights of the full video either with or without the corresponding video highlights. When prepared as video clips, the recommended audio segments can include the corresponding video segment along with additional information and/or metadata identified by analyzing the audio content.

FIG. 1 is a block diagram illustrating an example of a network environment for creating and recommending audio segments from audio content episodes. In the example shown, clients 101, 103, and 105 are network computing devices that receive recommended audio segments from server 111. Examples of network computing devices include but are not limited to a smartphone device, a tablet, a laptop, a virtual reality headset, an augmented reality device, a gaming console, and a desktop computer, among others. The recommended audio segments may be provided to clients 101, 103, and 105 via one or more audio segment feeds. Clients 101, 103, and 105 are connected to server 111 via network 107. Examples of network 107 include one or more of the following: a mobile communication network, the Internet, a direct or indirect physical communication connection, a Wide Area Network, a Storage Area Network, and any other form of connecting two or more systems, components, or storage devices together. Also connected to network 107 are audio content servers 131 and 133. In various embodiments, audio content episodes are hosted on one or more audio content servers such as audio content servers 131 and 133 and the hosted audio content episodes are received at server 111 for segment analysis and recommendation. Server 111 includes one or more processors such as processor 113 and memory 115 and is communicatively connected to database 121. In some embodiments, the audio segments recommended to users of clients 101, 103, and 105 by analysis performed by server 111 reference the corresponding audio content episodes hosted on audio content servers 131 and 133.

In various embodiments, server 111 utilizes processor 113 and memory 115 to analyze received audio content episodes. The episodes are analyzed to identify audio segments. For example, for each received audio content episode, one or more audio segments may be identified. The audio segments can be short clips extracted from the full audio content episode. As part of the identification process, the audio segments are automatically tagged. The applied tags can be based on content identified within the segment such as topics and speakers. In some embodiments, the automatically determined tags, audio segment, audio segment ranking, and/or other related analysis of the received audio content episodes is stored in database 121. In some embodiments, user profile information, attributes, and/or interests are stored in database 121 and can be used to match identified audio segments with users based at least on the attributes of the user.

In some embodiments, the components shown in FIG. 1 may exist in various combinations of hardware machines. Although single instances of components have been shown to simplify the diagram, additional instances of any of the components shown in FIG. 1 may exist. For example, server 111 may include one or more servers for analyzing and segmenting audio content episodes. Components not shown in FIG. 1 may also exist.

Figure 2:
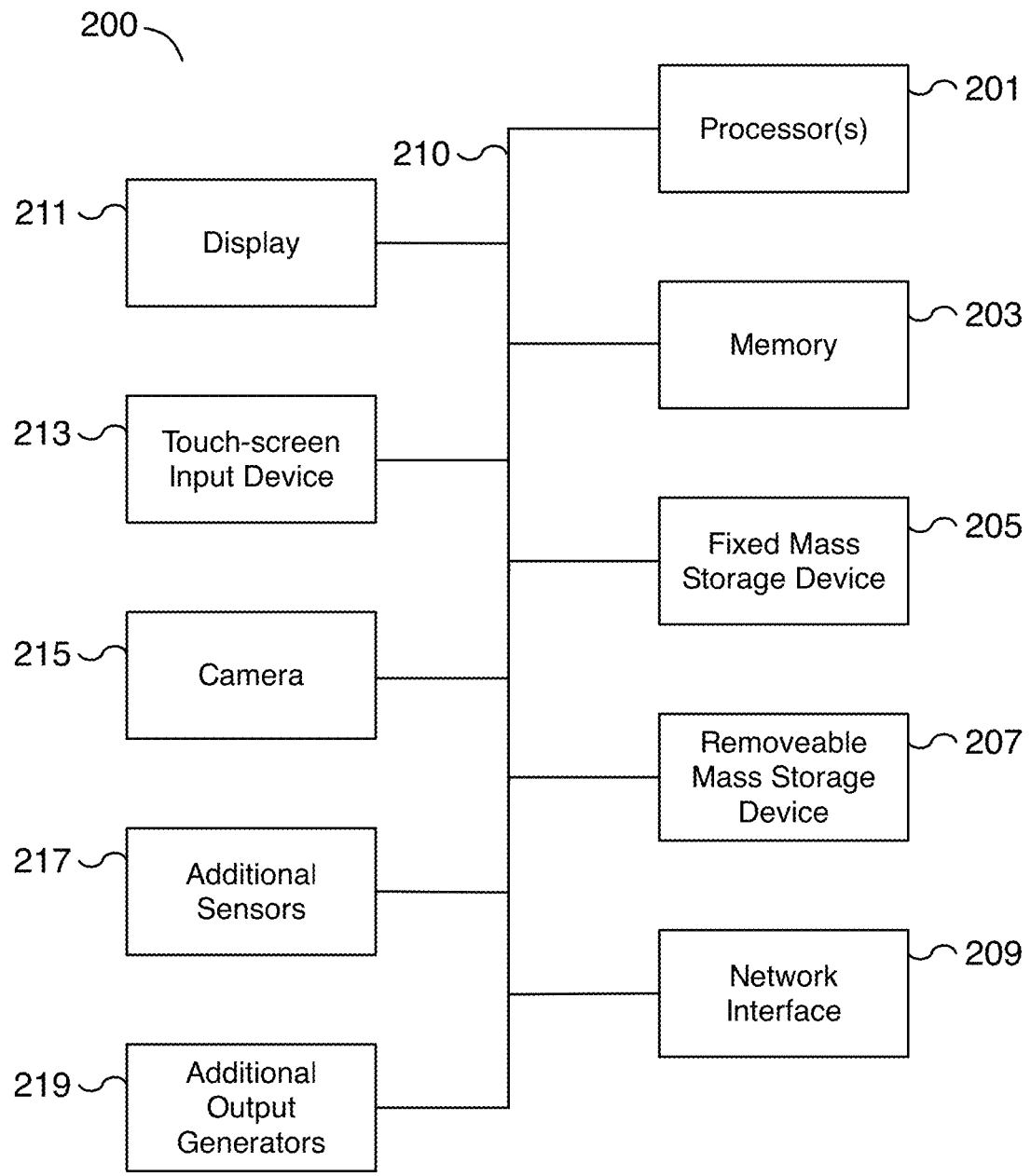
FIG. 2 is a functional diagram illustrating a programmed computer system for analyzing audio content episodes for recommended audio segments.

FIG. 2 is a functional diagram illustrating a programmed computer system for analyzing audio content episodes for recommended audio segments. As will be apparent, other computer system architectures and configurations can be used to perform the audio segmentation and recommendation. Computer system 200, which includes various subsystems as described below, includes at least one microprocessor subsystem (also referred to as a processor or a central processing unit (CPU)) 201. For example, processor 201 can be implemented by a single-chip processor or by multiple processors. In some embodiments, processor 201 is a general purpose digital processor that controls the operation of computer system 200. In some embodiments, processor 201 may support specialized instruction sets for performing inference using machine learning models. In some embodiments, processor 201 may include one or more machine learning processors including one or more graphics processing units along with one or more central processor units. Using instructions retrieved from memory 203, processor 201 controls the reception and manipulation of input data, and the output and display of data on output devices (e.g., display 211). In some embodiments, processor 201 includes and/or is used to provide functionality for sharing and recommending audio segments identified by analyzing corresponding audio content episodes. In some embodiments, processor 201 includes and/or is used to provide functionality for creating an audio segment feed based on recommended audio segments. The recommended audio segments may be based at least in part on attributes of the specific user for which the recommendations are directed to. In some embodiments, processor 201 relies on the additional compute power of an additional output generator such as a dedicated machine learning processor of additional output generators 219. In some embodiments, processor 201 includes and/or is used to provide server element 111 with respect to FIG. 1 and/or performs the processes described below with respect to FIGS. 3-7.

In some embodiments, processor 201 is coupled bi-directionally with memory 203, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 201. Also as is well known in the art, primary storage typically includes basic operating instructions, program code, data, and objects used by processor 201 to perform its functions (e.g., programmed instructions). For example, memory 203 can include any suitable computer-readable storage media, described below, depending on whether, for example, data access needs to be bi-directional or uni-directional. For example, processor 201 can also directly and very rapidly retrieve and store frequently needed data in a cache memory (not shown).

In some embodiments, computer system 200 includes a removable mass storage shown as removable mass storage device 207 that provides additional data storage capacity, and is coupled either bi-directionally (read/write) or uni-directionally (read only) to processor 201. For example, removable mass storage device 207 can also include computer-readable media such as flash memory, portable mass storage devices, magnetic tape, PC-CARDS, holographic storage devices, and other storage devices. Fixed mass storage device 205 can also, for example, provide additional data storage capacity. Common examples of fixed mass storage device 205 include flash memory, a hard disk drive, and an SSD drive. Mass storage devices 205 and 207 generally store additional programming instructions, data, and the like that typically are not in active use by processor 201. Mass storage devices 205 and 207 may also be used to store, at least temporarily, audio content episodes and/or audio segments identified from the audio content episodes by computer system 200. It will be appreciated that the information retained within mass storage devices 205 and 207 can be incorporated, if needed, in standard fashion as part of memory 203 (e.g., RAM) as virtual memory.

In addition to providing processor 201 access to storage subsystems, bus 210 can also be used to provide access to other subsystems and devices. As shown, these can include a display 211, a network interface 209, a touch-screen input device 213, a camera 215, additional sensors 217, additional output generators 219, as well as one or more auxiliary input/output device interfaces such as a sound card, speakers, a keyboard, additional pointing devices, and other subsystems as needed but not shown. For example, additional sensors 217 may include a location sensor, an accelerometer, and/or a proximity sensor, and may be useful for analyzing additional context for identifying audio segments from audio content. Additional output generators 219 may also include auxiliary boards and/or processors for accelerating certain operations such as machine learning compute operations. For example, additional output generators 219 may include specialized machine learning processors or graphics processing units with dedicated memory for performing machine learning tasks such as machine learning inference. In some embodiments, computer system 200 is a headless computer server system with no dedicated output display. For example, the visual output of computer system 200 may be accessed remotely via a remote shell or other remote user interface.

Network interface 209 allows processor 201 to be coupled to another computer, computer network, or telecommunications network using one or more network connections as shown. For example, through network interface 209, processor 201 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 209.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above and magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 210 is illustrative of any interconnection scheme serving to link the subsystems. Other computer architectures having different configurations of subsystems can also be utilized.

Figure 3:
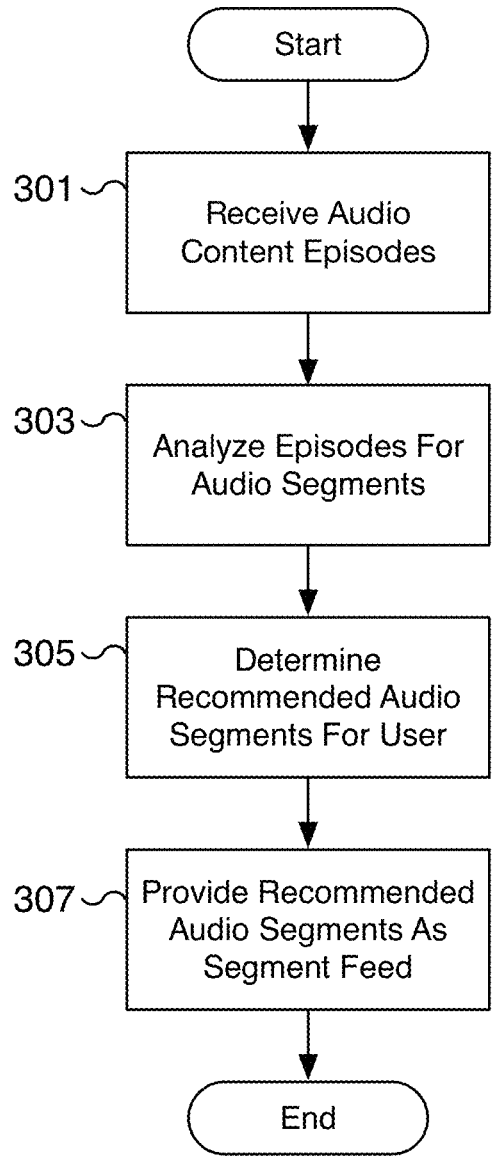
FIG. 3 is a flow chart illustrating an embodiment of a process for analyzing audio content episodes for recommended audio segments.

FIG. 3 is a flow chart illustrating an embodiment of a process for analyzing audio content episodes for recommended audio segments. Using the process of FIG. 3, audio segments are identified within received audio content episodes based on analyzing the content of each audio content episode. The segments are automatically tagged, and then selective audio segments are recommended to users. In various embodiments, a set of recommended audio segments is presented to a user as a segment feed. Users can utilize the provided segment feed to navigate through the recommended audio segments, discovering which corresponding audio content episodes among the recommended segments to further explore. In some embodiments, the analysis performed by the process of FIG. 3 is performed by server 111 of FIG. 1 on audio content episodes received from audio content servers such as audio content servers 131 and 133 of FIG. 1. In some embodiments, the recommended audio segments are provided to users such as users corresponding to clients 101, 103, and/or 105 of FIG. 1. In some embodiments, the results of the analysis performed by the process of FIG. 3 are stored in a data store such as database 121 of FIG. 1.

At 301, audio content episodes are received. For example, audio content episodes such as podcast episodes are received at an analysis server such as server 111 of FIG. 1. The episodes may be downloaded or captured from one or more audio content servers for hosting, broadcasting, publishing, or producing podcast or video episodes. In various embodiments, different podcast shows and their corresponding audio content episodes may be available from different sources. In some embodiments, the audio content episodes correspond to one or more live audio episodes. For example, as an audio or video episode is being recorded, the live audio content is captured and received at 301. In some embodiments, the audio content is an audio channel of a video. For example, one or more audio channels of a video (either live or pre-recorded) is extracted and received at 301.

At 303, audio content episodes are analyzed for audio segments. Each of the audio content episodes received at 301 are analyzed. The analysis includes analyzing the content of each audio content episode to identify audio segments. For example, the audio content episodes can be analyzed to extract different content signals, which are used to determine relevant audio segments. In some embodiments, one or more machine learning models are used to extract one or more content signals. For example, a first machine learning model can be used to identify the topics discussed in the audio episode, a second machine learning model can be used to identify speakers, and a third machine learning model can be used to identify advertisements. In some embodiments, the output from the analysis for one content signal is used as an input to identify a second content signal. The results of each content signal can be used to identify relevant audio segments. In some embodiments, the audio content is transformed to one or more different formats for analysis. For example, the audio content can be transcribed and analyzed as text-based input rather than audio input. As another example, the audio content can be transformed to a different domain such as the frequency domain before analysis is performed. In various embodiments, the results of the analysis performed on an audio content episode are one or more identified audio segments that are automatically tagged. The tags can be descriptive tags such as tags that identify speakers, topics covered, location of the podcast, genre, and other properties related to the audio content episode and segment. In some embodiments, the analysis includes identifying internally used tags used to determine recommended audio segments within an audio content episode. The internal tags may not be surfaced to the user but are used for intermediate analysis steps.

At 305, recommended audio segments are determined for a user. For example, based on attributes specific to a user, audio segments are selected for recommendation. In various embodiments, only a subset of the identified audio segments is recommended to a user. For example, a user's preferences and/or interests are used to select the recommended audio segments from available identified audio segments. In some embodiments, a user's social graph is used to identify recommended audio segments. For example, a user can follow other users with similar listening tastes. In some embodiments, users are matched with recommendations at least in part by matching a user's attributes with the automatically determined tags of the identified audio segments. For example, a user can express interest in topics associated with the tags #Business, #Parenting, #Sport, #Technology, and #Wellness, among others. Users can also specify more detailed tags such as #basketball, #GoldenStateWarriors, and #NBA. The specified tags are used to select recommended audio segments from the audio segments identified at 303.

At 307, recommended audio segments are provided as a segment feed. For example, a segment feed is created that includes the recommended audio segments determined at 305. In some embodiments, the segment feed is a playlist of recommended audio segments. A user can receive the segment feed and navigate through the recommended audio segments included in the feed. A user can skip through or past audio segments, deciding whether to mark the corresponding audio content episode for further listening. In some embodiments, an audio segment feed can be used to play each recommended audio segment in the feed automatically without interruption. As one recommended audio segment completes, the next audio segment begins playing. In some embodiments, the audio segment feed is continuously replenished with new recommendations. In some embodiments, a user can receive and/or subscribe to one or more segment feeds. Custom segment feeds can be created for a user based on preferences, scope, and other attributes. For example, different segment feeds can be provided and may include a daily news feed, an entertainment feed, a politics feed, a friends feed, a work feed, etc. In various embodiments, feeds can be provided for an individual specific user or for a group of users.

In some embodiments, a recommended audio segment is utilized to create a highlight video clip. The highlight video clip includes the audio of the recommended audio segment and can be provided as shareable content with a reference to the corresponding content episode and/or uploaded for hosting at a variety of different content media providers, including video content distributors. For example, a highlight video clip that includes the recommended audio segment can be shared via email, social media, or other mediums to introduce users to the corresponding content episode. Since the recommended audio segment is a highlight of the audio (or video) content episode, playing of the highlight video clip provides users with a preview/excerpt of the full content episode. In various embodiments, the video portions of the highlight video clip include visual indictors of the audio segment and/or corresponding content episode. For example, the video clip can include the name of the episode, speakers of the episode, subtitles and speaker information synchronized for playing with the recommended audio segment, tags corresponding to the audio segment and/or episode, a reference to the corresponding episode, references to related content episodes or audio segments, and/or a reference to content applications and/or platforms for playing the corresponding episode, among other related information. In the event the recommended audio segment is extracted from a video content episode, the highlight video clip can include both the recommended audio segment as well as the corresponding video segment from the video content episode. In some embodiments, the highlight video clip includes multiple recommended audio segments extracted from the same audio or video content episode. For example, the highlight video clip can include three of the top recommended audio segments of an audio content episode. The highlight video clip can also include multiple recommended audio segments extracted from different episodes of the same show, such as a podcast show or video show. For example, three recommended audio segments (and corresponding video portions) are selected from episodes of a podcast show to highlight to users the podcast show rather than an individual episode of the show. Similarly, the recommended audio segments can be extracted from different podcast shows and content media (such as videos) to introduce users to the associated content, related content, and/or content platform.

Figure 4:
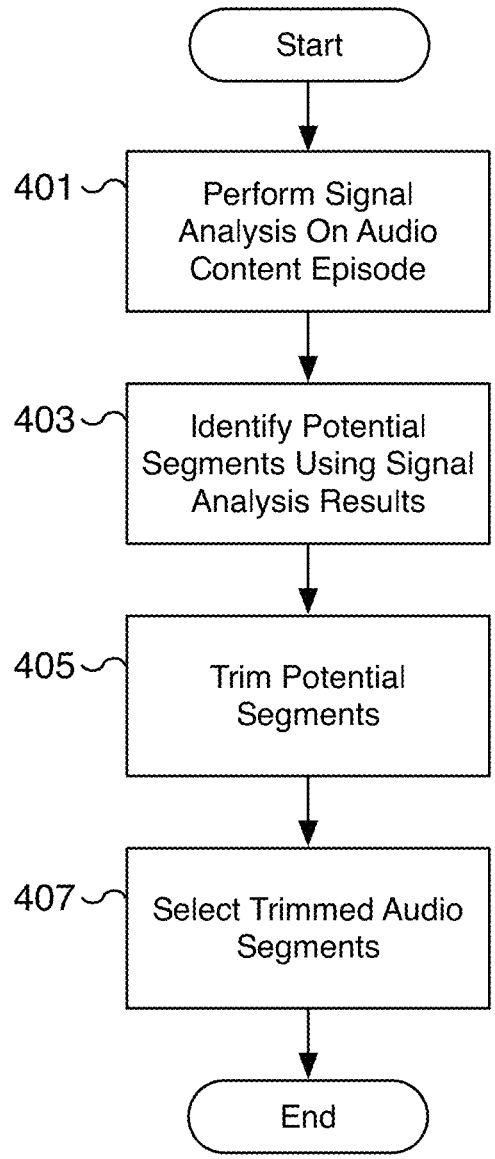
FIG. 4 is a flow chart illustrating an embodiment of a process for analyzing an audio content episode to identify audio segments.

FIG. 4 is a flow chart illustrating an embodiment of a process for analyzing an audio content episode to identify audio segments. Using the process of FIG. 4, audio segments are identified within a received audio content episode based on analyzing the content of the episode. In various embodiments, the identified audio segment is trimmed to emphasize the included content and to exclude extraneous or less relevant content. The audio segments can be automatically tagged based on the content analysis. In some embodiments, the process of FIG. 4 is performed at step 303 of FIG. 3. In some embodiments, the process of FIG. 4 is performed by server 111 of FIG. 1. In some embodiments, select audio segments from the identified audio segments are recommended to users such as users corresponding to clients 101, 103, and/or 105 of FIG. 1. In some embodiments, the results of the analysis performed by the process of FIG. 4 are stored in a data store such as database 121 of FIG. 1.

At 401, signal analysis is performed on an audio content episode. In some embodiments, as part of the analysis, the audio content episode is first transformed into one or more different input formats. For example, the audio content episode may be first transcribed and the transcription may be used as an input for content analysis. In various embodiments, one or more machine learning models are applied to the input data to determine content signals. Example content signals identified using the machine learning models include topics, speakers, advertisements, music, questions, monologues, etc. For example, a machine learning model can be trained to identify which portions of content are long monologues with uninterrupted speech. As another example, a machine learning model can be trained to identify topics as they are covered in the audio content episode. Similarly, among other content signals, different machine learning models can be trained to identify when questions are asked, when advertisements occur, and when music is played in the audio content episode.

At 403, potential audio segments are identified using the signals analysis results. For example, the content signals identified at 401 are used to identify relevant audio segments within the audio content episode. In some embodiments, the identified content signals are merged together. For example, one or more heuristics are applied to each content signal determined at 401 and merged into a single cumulative content signal. The cumulative content signal can be a measurement of multiple characteristics of the audio content episode. In some embodiments, the cumulative content signal is a moving average. In various embodiments, the merged cumulative signal is analyzed to identify potential audio segments. For example, peaks are identified and can be used to designate relative start and stop times of a potential audio segment. Similarly, the area under the cumulative signal can be used to identify the highest value potential audio segment. In some embodiments, the analysis is performed on one or more identified signals, one of which may be a merged cumulative signal. For example, avoidance segments can be identified. The avoidance segments can be used to negate potential audio segments from being selected. For example, an avoidance segment can reference an advertisement segment, a music segment, or another segment that should not appear in a recommended audio segment. Music segments identified as avoidance segments can include segments where music is used to augment an introduction, transition, or closing and their inclusion in an audio segment does not make for strong potential audio segments for recommendations.

In some embodiments, the analysis to identify potential audio segments also automatically determines tags to associate with each potential audio segment. For example, the topic content signals can be used to identify one or more topic tags for a potential audio segment. As another example, a speaker content signal can be used to identify one or more speaker tags for a potential audio segment. In various embodiments, the tags are associated with the potential audio segment and can be used for categorizing the segment and/or the corresponding audio content episode. The identified tags can include both internal tags that are only used for analysis as well as external tags, such as topic, category, and/or speaker tags, etc. that are surfaced and presented to users. External tags may be more generalized whereas internal tags may include granular details describing specific portions of an episode including individual words and/or phrases of the audio content. For example, surfaced tags may include #nba, #basketball, and #playoffs, whereas corresponding internal tags may additionally include #possession, #turnover, #threepointer, #steal, #error, #playoffs, #matchup, #finals, and #mvp.

At 405, potential segments are trimmed. For example, each potential audio segment identified at 403 is trimmed to a proper length. In some embodiments, the start and end points of a potential audio segment are selected to maximize the value of the segment. For example, a potential audio segment with a long monologue can be trimmed to only highlight the most captivating portion of the segment. As another example, a potential audio segment is trimmed to fit within a configurable time restriction, such as less than 2 minutes. In various embodiments, a machine learning model can be used to trim potential audio segments. The model can be trained by providing multiple trimmed audio segment candidates and allowing an operator to select the best trimmed audio segment. In some embodiments, the model can be trained by observing user behavior with multiple candidate audio segments. For example, one or more different users are provided with different trimmed audio segment candidates and the user interaction is used as training data. The parameters of a trimmed potential audio segment such as the start and stop offsets used to trim the segment can be stored in a data store such as database 121 along with additional metadata of each potential audio segment.

At 407, trimmed audio segments are selected. For example, the audio segments trimmed at 405 are selected to determine the best candidates to retain. In some embodiments, the trimmed audio segments are ranked and/or filtered out to determine which segments to select. For example, a machine learning model can be used to select and/or rank the candidate trimmed audio segments. For each audio content episode, one or more audio segments can be selected. In some embodiments, the input for selection is an aggregate score based on the content analysis performed at 401. For example, an aggregate score can be used to evaluate the strength of each audio segment. In some embodiments, once selected, the tags for a selected trimmed audio segment are stored and associated with the selected trimmed audio segment. The automatically determined tags can be stored in a data store such as database 121 along with additional metadata of the segment. In some embodiments, only a subset of the tags is eventually surfaced to the user and provided along with a recommended audio segment.

Figure 5:
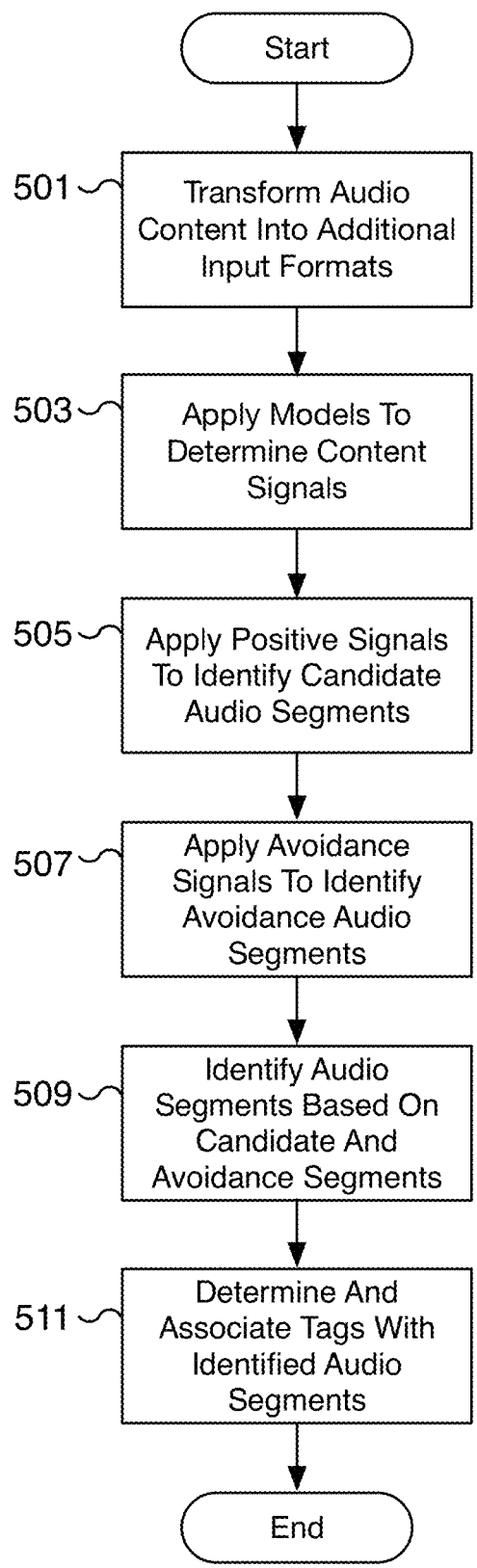
FIG. 5 is a flow chart illustrating an embodiment of a process for analyzing an audio content episode to identify audio segments.

FIG. 5 is a flow chart illustrating an embodiment of a process for analyzing an audio content episode to identify audio segments. For example, using the process of FIG. 5, an audio content episode is analyzed to identify positive and avoidance signals. The analyzed signals are used to identify and select audio segments. In some embodiments, the audio segments can be automatically tagged based on the content analysis. In some embodiments, the process of FIG. 5 is performed at step 303 of FIG. 3 and/or at steps 401 and/or 403 of FIG. 4. In some embodiments, the process of FIG. 5 is performed by server 111 of FIG. 1. In some embodiments, select audio segments from the identified audio segments are recommended to users such as users corresponding to clients 101, 103, and/or 105 of FIG. 1. In some embodiments, the results of the analysis performed by the process of FIG. 5 are stored in a data store such as database 121 of FIG. 1.

At 501, audio content is transformed into additional input formats. In various embodiments, the audio content is transformed into one or more additional input formats for analysis and identifying different content signals. For example, the audio content of an audio content episode is transcribed into a text-based version of the audio content. The text-based version can include identifying speakers and their respective dialogue with corresponding timestamps. As another example, the audio content of an audio content episode can be transformed from the time domain into the frequency domain. The different transformed formats can be used as input for identifying both positive and avoidance signals that are beneficial for identifying audio segments from an audio content episode.

In some embodiments, the transformed audio content includes multiple text-based versions. For example, an initial transcription is performed and then transformed into one or more different transcriptions. The different transcriptions can be performed to identify specific relevant characteristics and/or to remove particular noise/artifacts. For example, a version of the transcription can remove certain punctuation, identify pauses, identify speaker transitions, remove stuttering or repeated words, identify overtalk, etc.

At 503, models are applied to determine content signals. For example, one or more models are applied to determine different content signals. The content signals can identify different characteristics and/or properties of the content such as topics, change in topics, intensity, questions asked, speakers, speaker changes, music, advertisements, sentence formats, etc. In some embodiments, a statistical model is used to determine the topics covered in the audio content. For example, a statistical model can be applied to the text-based version of the audio content to associate topics with each word or series of words in an audio content episode. In some embodiments, one or more different machine learning models are trained to determine different content signals. The output of inference performed using each model is a different content signal. Positive content signals can identify portions of content that should be featured. In contrast, avoidance content signals can identify portions of the content that should not be featured, such as advertisements. In some embodiments, the identified content signals are modified by applying one or more different heuristics or rules. For example, the content signals can be transformed according to different heuristics or rules such that a content signal can be applied more consistently and uniformly across different audio content episodes and/or with other content signals. In some embodiments, the output of the one or more models are tags that describe or label the associated portions of the audio content. Example tags include speaker tags, content rating tags, topic tags, category tags, and ratings tags, among others.

In various embodiments, for each applied model, there can be optional pre-processing and post-processing steps. For example, a pre-processing step may organize/manipulate the input data in preparation for applying a model. Similarly, a post-processing step can be used to prepare the output data, for example, by applying a functional or rule-based transformation to the output results. The post-processing step can also be used to help prepare the output results for additional processing by later models or analysis steps. In some embodiments, heuristics are applied during pre-processing and/or post-processing. For example, the output signals from a first model can be mapped to the output domain of a second model and the two output signals can be filtered to identify matches where the output signals from both models agree. As another example, the output of a first model can be used to score the output of a second model, such as applying a magnitude output signal to score a location output signal.

At 505, positive content signals are applied to identify candidate audio segments. For example, one or more positive content signals are applied and used to identify candidate audio segments. The positive content signals identify portions of the audio content that should be featured. For example, a monologue can be identified with a positive content signal. As another example, a discussion topic started with a question or prompt can be identified. As yet another example, a positive content signal can identify when a speaker starts and ends. In some embodiments, multiple positive content signals are clustered to determine a unified result. For example, one or more positive content output signals can be analyzed together to determine the start and end of a candidate audio segment. By combining multiple output signals, the offsets for the start and end of an audio segment are more accurately identified. As an example, a first signal may identify the location of changes in topic, a second signal may identify changes in sentence structure such as the end or start of a sentence, a third signal may identify pauses, and a fourth signal may score the different locations of the audio content at the word-level of granularity. The signals can be applied together to accurately identify the start and end of a candidate audio segment. As another example, clustering techniques can be applied to determine a topic for a candidate audio segment. The content signals for individual portions of the candidate audio segment can be clustered to determine topics for the entire audio segment.

In some embodiments, the positive content signals can be merged together into a single cumulative signal. The cumulative signal can have an aggregate value that reflects the positive rating/value of the audio content episode at any particular time in the audio content episode. The positive rating/value may be a moving average. In some embodiments, one or more heuristics or rules are applied to transform each positive content signal before merging them to create a cumulative positive content signal. Using the content signals, one or more candidate audio segments are identified. For example, the area under the cumulative positive content signal can be used to identify the best candidate audio segments. A start point for a candidate audio segment can be determined by using the start of a question, the start of a topic, or another content parameter/characteristic. Similarly, an end point for a candidate audio segment can be determined by using the end of a speaker's dialogue, the start of a new question, the start of music, the start of an advertisement, or another content parameter/characteristic. In various embodiments, the potential start and end points are represented as peaks in the positive content signals. For example, the time between two peaks in a cumulative positive content signal indicates the start and end of an audio segment that begins at the first peak and finishes at the second peak. In some embodiments, multiple candidate audio segments are identified for a particular audio content such as an audio content episode.

At 507, avoidance content signals are applied to identify avoidance audio segments. For example, one or more avoidance content signals are applied and used to identify portions of the audio content to avoid recommending. The avoidance content signals identify portions of the audio content that should not be featured in potential audio segments. For example, an avoidance signal can identify advertisements inserted in the audio content. Similarly, an avoidance signal can identify transition music, an episode introduction, ending credits, or another audio segment that should be avoided in selecting a potential audio segment. Multiple avoidance content signals can also be clustered to determine a unified result. In various embodiments, an audio segment to avoid is an identified avoidance audio segment. In some embodiments, the avoidance content signals can be merged together into a single cumulative avoidance content signal. The cumulative avoidance content signal can have an aggregate avoidance value that reflects the negative rating/value of the audio content episode at any particular time in the audio content episode. The negative rating/value can be a moving average value. In some embodiments, one or more heuristics or rules are applied to transform each avoidance content signal before merging them to create a cumulative avoidance content signal. By using the avoidance signals, one or more avoidance audio segments are identified. Each avoidance audio segment represents a portion of the audio content that should not be considered as a potential audio segment. In some embodiments, similar to positive content signals, the start and end points of an avoidance audio segment can be determined by an avoidance content signal. Unlike the positive content signals, in various embodiments, the start and end of an avoidance audio segment can be determined by an avoidance value exceeding a threshold. For example, any portion of the audio content with an avoidance value that exceeds the threshold value is avoided and included in an avoidance audio segment. For a particular audio content episode, multiple avoidance audio segments can be identified.

At 509, audio segments are identified based on candidate and avoidance segments. For example, one or more candidate segments are eliminated or trimmed by comparing the candidate segments to the avoidance segments. In some embodiments, any portions of any candidate audio segment that overlap with an avoidance segment are removed from consideration. The avoidance segment can be used to trim the length of a candidate segment, for example, by delaying the start of the candidate audio segment or advancing the end of the candidate audio segment. In some embodiments, a candidate audio segment is split into two or more candidate audio segments. For example, an avoidance audio segment that occurs in the middle of a candidate audio segment can result in excluding the middle portion of the candidate audio segment that overlaps with the avoidance segment. The candidate audio segment can be split into two candidate audio segments. Once any overlaps with avoidance segments have been resolved, the remaining candidate audio segments are segmented portions of the audio content episode.

At 511, tags are determined and associated with the identified audio segments. For example, for each audio segment identified at 509, tags are automatically determined based on the models applied at 503. In some embodiments, the tags are topic labels and identify the topics covered in the corresponding audio segment. Other tags can include speaker tags, category tags, relevance tags, ratings tags, etc. In some embodiments, the tags are stored in a data store, such as database 121 of FIG. 1, along with other metadata of the identified audio segment. In some embodiments, one or more tags are determined after identifying the audio segments at 509. For each identified audio segment, corresponding tags can be determined by applying one or more machine learning models. For example, a topic model can be applied to infer topic tags. Similarly, a category model can be applied to infer category tags. In some embodiments, internal tags are determined and utilized during the analysis of the audio content episode. The internal tags may describe specific details and/or portions of the audio content. Once the audio segments are identified at 509, external tags are selected at 511 based on the internals tags associated with the identified segments. The external tags can be surfaced to a user and can be selected for their user-facing descriptive properties. In some embodiments, the external tags are determined based on internal tags, for example, by classifying the internal tags, selecting broader category tags that match the internal tags, mapping internal tags to external tags, or via another appropriate selection and/or mapping technique.

Figure 6:
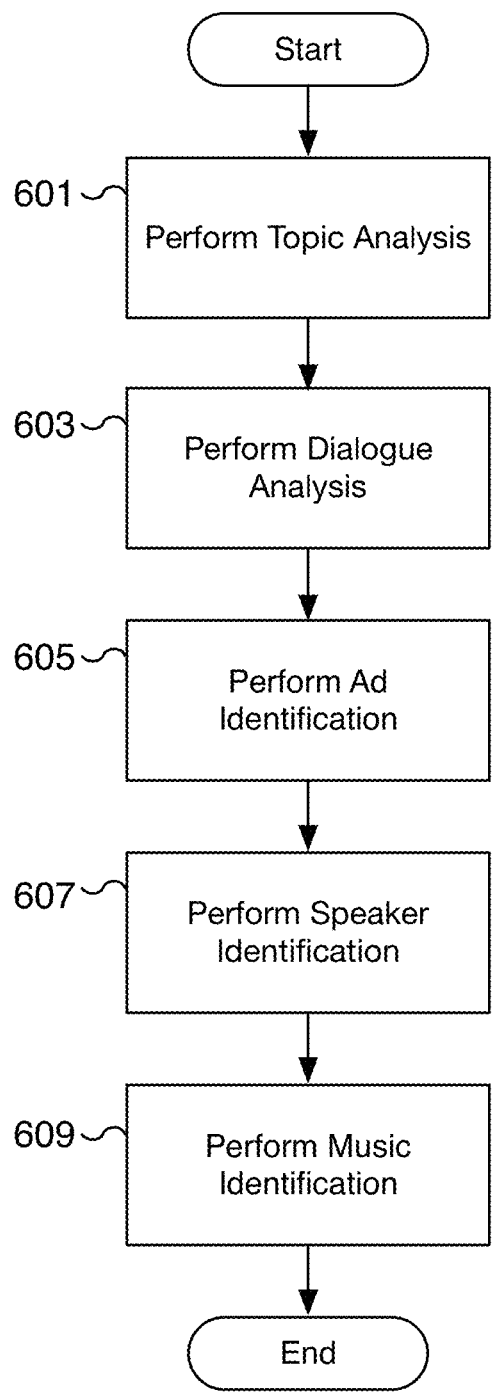
FIG. 6 is a flow chart illustrating an embodiment of a process for analyzing an audio content episode to determine content signals.

FIG. 6 is a flow chart illustrating an embodiment of a process for analyzing an audio content episode to determine content signals. For example, one or more different models including statistical and machine learning models are used to determine content signals for analyzing audio content. The models may be applied to the audio content and/or to a transformed version of the content such as a transcription of the audio content. In some embodiments, the content signals determined from analyzing the audio content include both positive content signals that can be used to identify portions of the audio content to feature as well as avoidance content signals that can be used to identify portions of the audio content that should not be featured. In various embodiments, the determined content signals can be used to identify and select audio segments for recommendations. Although shown in a linear order and in some embodiments the output of one analysis step may be used as an input to another analysis step, in general, the content analysis steps 601, 603, 605, 607, and 609 can be performed in another order and/or in parallel as appropriate. For example, the different analysis steps of FIG. 6 can be performed in parallel to determine the different corresponding content signals. In some embodiments, one or more of the content signals are later merged to create a cumulative content signal. For example, positive content signals and/or avoidance content signals can be aggregated as described with respect to FIG. 5. In some embodiments, the process of FIG. 6 is performed at step 303 of FIG. 3, at step 401 of FIG. 4, and/or at step 503 of FIG. 5. In some embodiments, the process of FIG. 6 is performed by server 111 of FIG. 1. In some embodiments, the models and/or results of the analysis performed by the process of FIG. 6 are stored in a data store such as database 121 of FIG. 1.

At 601, topic analysis is performed. For example, a topic analysis model is applied to determine the topics covered during the course of an audio content episode. In some embodiments, the topic analysis is performed on a text-based version of the audio content, such as a transcription. The input format may include identified speakers as well as other metadata including punctuation. In some embodiments, a statistical model is used to analyze the topics covered in the audio content. For example, a statistical model can be applied to the text-based version of the audio content to associate topics with each word or series of words in an audio content episode. Each word or series of words can be associated with one or more topics. For example, the topic analysis can determine how strong the language in the audio content is relative to a topic. The topic analysis can further be used to calculate a sentiment score, for example, a sentiment score based on topic over the course of the audio content episode. In some embodiments, the topics identified, for example, with strong sentiment scores, are associated with tags such as topic labels. The determined tags can be used to later associate the topic labels with audio segments selected from the audio content. In some embodiments, a machine learning model is used to identify topics and sentiment. For example, one or more machine learning topic models are applied to identify topics associated with different portions of an audio content episode. In some embodiments, a generic topic model is applied to identify generic tags and a second more specific topic model is applied to identify more granular topic tags. An example of a generic tag can include #politics whereas corresponding specific tags can include #debate, #campaign, #electoralcollege, #administration, #convention, #candid, and #speech, among others. In some embodiments, one or more models are updated based on relevancy and/or recency. For example, a specific topic model can be updated to emphasize trending tags from the last two weeks or another appropriate time period. Similarly, one or more models can be localized to regions, categories, or another grouping.

At 603, dialogue analysis is performed. For example, one or more dialogue machine learning models are applied to analyze the dialogue covered during the course of an audio content episode. In some embodiments, the dialog analysis is performed on a text-based version of the audio content, such as a transcription. The input format may include identified speakers as well as other metadata including punctuation. In some embodiments, a statistical model is used to analyze the dialogue covered in the audio content. For example, the dialogue can be analyzed to identify when questions are asked. As another example, the dialogue can be analyzed to identify the intensity of the conversation including when voices are raised, or words are spoken more quickly or slowly. Additional properties of the dialogue can be identified including but not limited to speaker changes, the number of speakers, rapid back-and-forth conversation between speakers, and long monologues or uninterrupted speech, among others. In various embodiments, different parameters and/or characteristics of the dialogue are identified using one or more different models. In various embodiments, as the content is analyzed, different portions of the content can be associated with different tags. The determined tags can later be associated with audio segments selected from the audio content.

At 605, advertisement identification is performed. For example, one or more machine learning models are applied to analyze the audio content episode to determine which portions contain advertisements or other similar promotions. In some embodiments, the model is trained using advertisement information provided by the audio content publisher. For example, a podcast publisher can identify where advertisements are inserted into a podcast and/or provide reference material for included advertisements, for example, as initial training data. In some embodiments, the analysis is performed on a transcription of the audio content. For example, keywords for advertisements can be provided as input data to identify which portions correspond to advertisements associated with the provided keywords. The models can be trained and updated using operator feedback. In various embodiments, the identification of advertisements may be used as an avoidance signal to exclude advertisements from being included in any audio segments used as recommendations. In some embodiments, as the content is analyzed for advertisements, different portions of the content can be associated with different advertisement identification tags.

At 607, speaker identification is performed. For example, one or more machine learning models are applied to analyze the audio content episode to determine the identity of speakers. In various embodiments, the voice of a speaker is used to identify the speaker's identity. For example, a voice database of speakers is maintained and used to determine the identity of speakers within the audio content. A model trained using the voice database can be used to infer speaker identity. In some embodiments, a speaker may be unknown and is marked as unknown but assigned a unique identifier. At a later time, the speaker's identity may be added to the voice database and all analyzed instances of the speaker that were previously unknown can be associated with the now known identity of the speaker. In various embodiments, the speaker's identity can reference a speaker profile that includes the speaker's name, photo, online presence information, and/or shared published background, etc.

In some embodiments, metadata of the audio content episode is used as input for speaker identification. For example, a podcast episode may include show episode notes that reference featured speakers. Similarly, a speaker's identity may be included in the podcast episode title or podcast show title. These descriptions can be used as input to infer a speaker's identity. In some embodiments, the audio content and/or transcription is analyzed for a speaker's name. For example, a speaker's identity can be determined in part by analyzing the audio content corresponding to when a speaker introduces themselves and/or guests. In various embodiments, as the content is analyzed for the identity of speakers, different portions of the content can be associated with different speaker identification tags. The determined tags can later be associated with audio segments selected from the audio content.

At 609, music identification is performed. For example, one or more machine learning models are applied to analyze the audio content episode to determine which portions contain music. In some embodiments, the model is trained using a music training database that can be updated with new additions as appropriate. Additional detection parameters can be configured such as requirements for a minimum duration, intensity, and/or volume, among others. In various embodiments, the identification of music may be used as an avoidance signal to exclude certain types of music from being included in any audio segments used as recommendations. For example, portions where music is used to augment an introduction, transition, or the closing of an episode can be identified and avoided. The portions identified can be limited to portions where the music is determined to exceed a configured minimum duration such as 5 seconds. In some embodiments, as the content is analyzed for music, different portions of the content can be associated with different music identification tags. The tags may include the name of a song, the artist, the genre, how the music is used, etc.

Figure 7:
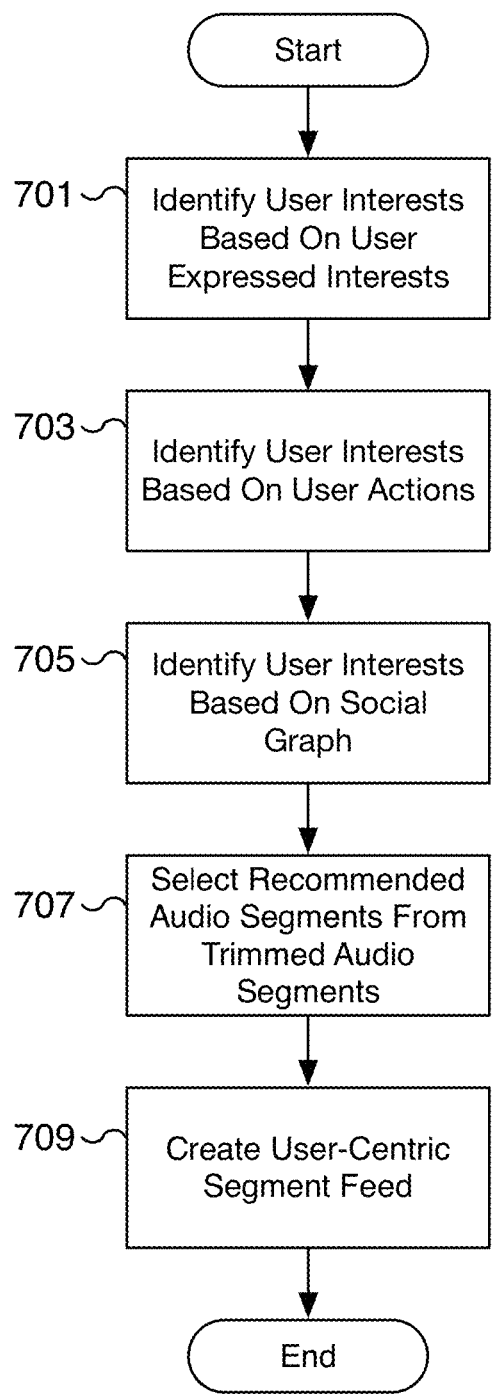
FIG. 7 is a flow chart illustrating an embodiment of a process for determining recommended audio segments for a user.

FIG. 7 is a flow chart illustrating an embodiment of a process for determining recommended audio segments for a user. Using the process of FIG. 7, audio segments identified from audio content episodes are selected for a specific user. The recommended audio segments are arranged in a segment feed that a user can navigate and consume. The segment feed introduces users to new audio content episodes without the user having to listen to entire episodes. Each audio segment can reference the corresponding full audio content episode in the event the user is interested in the entire episode. In some embodiments, the process of FIG. 7 is performed at step 305 of FIG. 3. In some embodiments, the process of FIG. 7 is performed by server 111 of FIG. 1 for a user such as a user corresponding to one of clients 101, 103, or 105 of FIG. 1. In some embodiments, the input sources and/or results of the process of FIG. 7 are stored in a data store such as database 121 of FIG. 1.

At 701, user interests are identified based on user expressed interests. For example, a user can select from available categories and/or specify categories of interest. In some embodiments, a user is presented with a list of common interests and selects which ones match the user's preferences. For example, a user can be presented with categories such as News, Business, Interviews, Sports, Technology, Brain Food, Parenting, Politics, and Wellness, among others and selects the ones that the user would like recommendations for. In some embodiments, a user selects and/or identifies media including podcasts, movies, music, magazines, etc. that the user enjoys or is interested in. For example, a user can select their favorite podcasts and movies as one technique to express their interests.

At 703, user interests are identified based on user actions. For example, based on a user's listening behavior and interaction with recommended audio segments and audio content episodes, additional user interests are inferred and identified. For example, a user's behavior including which audio segments a user listens to in completion and which full audio content episodes a user explores based on recommended audio segments can be used to identify user interests. Similarly, audio segments that a user skips or ignores can be used to identify the types of content a user is not interested in. In some embodiments, the user's behavior such as the sharing or promotion of audio segments or audio content episodes, the searching for audio segments, audio content episodes, or podcast shows, the subscription to podcast shows, etc. are used to infer user interests in similar content.

At 705, user interests are identified based on a user's social graph. For example, a user's interests can be augmented to consider the types of content consumed, shared, and/or interacted with by users within a user's social graph. In various embodiments, interests/preferences of users within a user's social graph can be used to infer a user's interests. For example, the audio content episodes subscribed to or promoted by a user within a user's social graph can be used to infer interest in similar material. As another example, the interest of other user's that subscribe to the same content can be used to infer user interest.

At 707, recommended audio segments are selected from trimmed audio segments. For example, from a pool of audio segments, selective segments are selected and recommended for a user. In various embodiments, the audio segments have been trimmed to fit within a certain duration, such as between 30 seconds and two minutes, or as appropriate for playback. The selected trimmed audio segments are selected based at least in part on attributes of the specific user, such as the user's interests identified at steps 701, 703, and/or 705. For example, the audio segments selected are based on matching the user's interests to the content of the trimmed audio segments. The audio segments can be described by tags and the tags are used as one metric for matching user interests to audio segments. For example, a user can be matched with recommendations at least in part by matching a user's interest attributes with the automatically determined tags of the trimmed audio segments. A user can express interest in topics associated with the tags such as #Business, #Parenting, #Sport, #Technology, and #Wellness, among others. Users can also specify more detailed tags such as #basketball, #GoldenStateWarriors, and #NBA. In some embodiments, the recommended audio segments are selected by applying transductive machine reasoning. For example, by applying transductive machine reasoning, predictions are performed to identify recommended audio segments that match a specific user (or a group of users to which the specific user belongs). Recommended audio segments can be selected without requiring expensive recompute operations such as matrix factorization operations.

In some embodiments, the audio segments selected at 707 are based on a search request, a subscription request, user interests, or another appropriate metric or factor. For example, a segment feed designed to highlight recent world events can be configured to include only audio content episodes published in the last 24 hours. The recommended audio segments can be selected by limiting the recommended audio segments based on a publish date/time factor. As another example, a "popular with friends" segment feed can be configured to only select audio segments corresponding to audio content episodes that a user's friends have listened to in the last two weeks. In some embodiments, the selected audio segments can be configured to include audio segments where 60% of the selected audio segments include content that the user is interested in and the remaining 40% are audio segments with content the user has not expressed interest in.

At 709, a user-centric segment feed is created. For example, a segment feed is created using the audio segments selected at 707. In various embodiments, the segment feed is a user-centric feed as the audio segments selected for inclusion are based on attributes of the user, such as user interests. In some embodiments, the user-centric feed is created for a group of users that share the same interests. In various embodiments, the segment feed is an ordered list of recommended audio segments and includes references to the full audio content episode from which the audio segment is extracted from. A user navigating through the segment feed can explore the corresponding full audio content episode. In some embodiments, the user can mark the episode for later playback and/or subscribe to the corresponding podcast show. A user can also interact with a visual representation of the segment feed, for example, by passively or interactively navigating through the audio segments of the feed. A user can remove audio segments, rearrange audio segments, play a selected audio segment, rate an audio segment, and bring an audio segment to the top of the audio segment feed, among other actions. In various embodiments, playing of an audio segment feed can be initiated automatically and the included audio segments can be presented in a continuous format. For example, the audio segments of the feed can be continuously played, automatically transitioning from one audio segment to the next. As the feed is played, metadata of the audio segment and corresponding audio content episode can be displayed to the user. For example, the user can be provided with the name of the speaker, the length of the full episode, the name of the episode, the publication date of episode, and tags associated with the episode, among other details.

Figure 8:
FIG. 8 is a diagram illustrating an embodiment of a user interface for recommended audio segments.

FIG. 8 is a diagram illustrating an embodiment of a user interface for recommended audio segments. In some embodiments, the user interface of FIG. 8 is displayed on clients 101, 103, and 105 of FIG. 1 when a user plays an audio segment included in a segment feed provided by server 111 over network 107 of FIG. 1. In various embodiments, the audio segment played from the segment feed is identified using the processes of FIGS. 3-7.

In the example shown, user interface 801 is displayed by a device such as a smartphone device when playing a recommended audio segment of the current segment feed. User interface 801 includes segment feed title 803, segment playback status indicator 805, speaker identifier 807, subtitles field 809, feedback buttons 811, audio content episode field 813, subscription button 815, tags field 817, and menu 819. In the example of user interface 801, segment feed title 803 shows "FOR YOU" which is the title of a user-centric audio segment feed created for the specific user. Segment playback status indicator 805 shows the play progress of the current audio segment. Interacting with segment playback status indicator 805 allows the user to pause or play the audio segment. Segment playback status indicator 805 also shows the progress of the playback using a circular progress indicator. Speaker identifier 807 includes an image of the current speaker in the audio segment. Overlaid on the speaker's photo is a tag associated with the speaker. The tag may be based on the speaker's name or another related naming association, such as the speaker's name or handle on a social media platform. In the example shown, speaker identifier 807 includes a placeholder image of the speaker with the placeholder speaker tag @username. For specific audio segments, an actual image of the speaker and the speaker's name identifier are used. As the speaker in the audio segment changes, the corresponding speaker information is also updated and changes. In some embodiments, speaker identifier 807 can be replaced by a host identifier (not shown) or album art (not shown). The host identifier can display a photo or avatar of the host, for example, in the event the actual speaker in the audio segment cannot be identified. In the event the host cannot be identified, album art of the corresponding audio content episode can be displayed. Below speaker identifier 807 is subtitles field 809. In some embodiments, subtitles of the currently playing audio segment are shown in subtitles field 809. In the example shown, the subtitle of subtitles field 809 shows the words "What's being said is transcribed and presented" as a placeholder for the actual subtitles. In various embodiments, the contents of speaker identifier 807 and subtitles field 809 are dynamic and change to reflect the current speaker and subtitles as the audio segment is played. Feedback buttons 811 allow a user to express user interest in the audio segment.

In the example shown, audio content episode field 813 shows information of the corresponding audio content episode for the current audio segment. Audio content episode field 813 includes the name of the corresponding audio content episode, its publication date, and its length. Audio content episode field 813 also includes a share button for sharing the audio segment. For example, a user can share the recommended audio segment with other users by sharing the recommended audio segment, an automatically generated highlight video clip that includes the recommended audio segment, an automatically generated highlight webpage that includes the recommended audio segment, and/or another reference to the recommended audio segment. In some embodiments, a user can bring up additional details of and interaction user interface elements for the corresponding episode by tapping on episode field 813. For example, in some embodiments, tapping on episode field 813 presents the user with user interface 901 of FIG. 9. Below audio content episode field 813 are subscription button 815 and tags field 817. Subscription button 815 includes the album art of the corresponding episode with an overlaid plus sign. Selecting subscription button 815 allows the user to subscribe to the corresponding podcast show. Shown between subscription button 815 and tags field 817 is a button labeled play full episode (not numbered). The play full episode button allows the user to play the full corresponding episode. For example, a user can access and play the full content episode by selecting the play full episode button. To the right of the play full episode button is tags field 817. Tags field 817 shows tags automatically associated with the audio segment and/or full audio/video content episode. In the example shown, tags field 817 includes the placeholder tag @USERNAME corresponding to the speaker and/or host of the episode. In various embodiments, tags field 817 is a horizontal scrolling field and can include additional tags such as category and topic tags. For example, in some embodiments, a user can scroll through tags to reveal additional tags by swiping left and right on tags field 817. In various embodiments, the displayed tags are interactive. For example, selecting a tag shows additional content related to the tag.

Along the bottom of user interface 801, menu 819 includes icons for initiating a search (represented by the magnifying glass/search icon), for listening to recommended audio segments (represented by the headphones icon), and for accessing and displaying a user's profile (represented by a user silhouette/profile icon). For example, to search for audio content, a user can access a search screen/user interface by selecting the search icon. In various embodiments, the search user interface allows a user to search for recommended audio segments, podcast shows, content based on hosts, and/or content by tags. To listen to recommended audio segments in the current segment feed, the user can access user interface 801 by selecting the headphones icon. By selecting the profile icon, the user can access the user's profile. In various embodiments, the user's profile includes attributes of the user such as a photo or avatar of the user, user following and user followers information, and subscribed audio content, among other attributes.

In various embodiments, a user navigates to the next audio segment in the segment feed by swiping up on user interface 801. Similarly, in some embodiments, a user can play the previous audio segment by swiping down on user interface 801. Other techniques for navigating between audio segments of the segment feed are appropriate as well.

Figure 9:
FIG. 9 is a diagram illustrating an embodiment of a user interface for interacting with an audio content episode based on a recommended audio segment.

FIG. 9 is a diagram illustrating an embodiment of a user interface for interacting with an audio content episode based on a recommended audio segment. For example, the user interface of FIG. 9 can be accessed from user interface 801 by interacting with episode field 813 of FIG. 8 when navigating a segment feed. In some embodiments, the user interface of FIG. 9 is displayed on clients 101, 103, and 105 of FIG. 1 as part of the process of exploring audio segments included in a segment feed provided by server 111 over network 107 of FIG. 1. In various embodiments, the corresponding audio segment is identified using the processes of FIGS. 3-7.

In the example shown, user interface 901 is displayed by a device such as a smartphone device when interacting with a recommended audio segment of the current segment feed. User interface 901 includes user interface tray 903 overlaid on user interface 801 of FIG. 8. User interface tray 903 allows the user to access the full audio content episode associated with the current audio segment. In some embodiments, user interface tray 903 allows the user to access the full video content episode associated with the current audio segment when audio segmentation is performed on video content. User interface tray 903 shows information of the corresponding content episode for the current audio segment including the full name of the audio (or video) content episode, its publication date, and its length. User interface tray 903 also includes a play interface for playing the entire episode. For example, selecting the play button begins the playing of the full audio (or video) content episode. In some embodiments, the play button brings forward a podcast or audio content episode player user interface (not shown) that allows the user to play the entire audio content episode along with skipping forward and back through the episode and view a timeline of the episode playback. The player user interface (not shown) can also include other playback features such as pausing and resuming playback, the ability to leave a review or comment about the episode, the ability to like or dislike the episode, the ability to display subtitles as the episode plays, and the ability to show the current speaker(s) as the episode plays, among others.

In the example shown, user interface tray 903 includes additional content that can be displayed by swiping to reveal the content. For example, below the play button, a description of the audio content episode can be included. The description can be prefaced with the label "About this episode" and include audio content episode show notes, topic time stamps and/or bookmarks, host information, and tags including speaker and topic labels, among others. Other information of the audio content episode can be included as well such as the number of likes, which friends in the user's social graph have listened to the episode, comments by friends, reviews, and sponsorship information, etc. In some embodiments, user interface tray 903 can be dismissed by swiping down using the handle element at the top of the tray. In some embodiments, dismissing user interface tray 903 returns the user-to-user interface 801 of FIG. 8. Although describe primarily with respect to full audio content episodes, the above user interfaces and interaction modes, including the user interfaces of FIGS. 8 and 9, also apply to video content episodes associated with recommended audio segments. For example, user interface tray 903 can include additional information related to a video content episode and playback controls for playing the corresponding full video content episode.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving media content episodes;
using machine learning to identify one or more media segments of interest in each of the media content episodes based at least in part on an analysis of content included in a corresponding media content episode, wherein each of the identified media segments is associated with one or more automatically determined tags;
generating a media segment feed for a specific user, including:
using machine learning to automatically select, for the specific user, a recommended media segment from the identified media segments based at least in part on one or more prior user interactions of the specific user with media content episodes and the automatically determined tags of the identified media segments; and
automatically providing the recommended media segment in the media segment feed, wherein:
the one or more prior user interactions of the specific user with media content episodes includes one or more interactions indicating types of content that the specific user is interested in, the one or more interactions selected from the group consisting of:
the specific user listening to a particular media segment to completion;
the specific user sharing the particular media segment with other users of different electronic devices; and
the specific user subscribing to the content corresponding to the particular media segment.

2. The method of claim 1, wherein the one or more prior user interactions of the specific user with media content episodes includes one or more other interactions by the specific user with respective media segments in the media segment feed.

3. The method of claim 1, wherein:
selecting, for the specific user, the recommended media segment from the identified media segments based at least in part on the one or more prior user interactions of the specific user with media content episodes includes identifying types of media content that the specific user is not interested in based on interactions in which the specific user skips or ignores particular media content.

4. The method of claim 3, wherein the one or more prior user interactions of the specific user with media content episodes includes a swiping gesture causing a next or previous media segment in the media segment feed to be played back before completion of playback of the recommended media segment.

5. The method of claim 4, wherein:
the one or more prior user interactions of the specific user with media content episodes includes a second swiping gesture causing additional content about the next or previous media segment to be displayed.

6. The method of claim 2, further comprising:
updating a machine learning model based on an interaction by the specific user with one of respective media segments within the media segment feed, the machine learning model configured to identify respective media segments to recommend in the media segment feed.

7. The method of claim 1, further comprising:
receiving an indication of a user action associated with advancing the media segment feed;
selecting for the specific user a second recommended media segment from at least the identified media segments; and
automatically providing the second recommended media segment in the media segment feed.

8. The method of claim 1, further comprising:
receiving an indication of a user action associated with an active media segment; and
providing a full corresponding media content episode associated with the active media segment.

9. The method of claim 1, wherein the analysis of content included in the corresponding media content episode includes identifying topics associated with identified word content in the corresponding media content episode.

10. The method of claim 9, wherein the automatically determined tags of the identified media segments are based on the identified topics.

11. The method of claim 1, wherein the analysis of content included in the corresponding media content episode includes automatically transcribing each of the media content episodes.

12. The method of claim 11, wherein transcribing each of the media content episodes includes automatically identifying one or more speakers of content in each of the media content episodes.

13. The method of claim 1, wherein the analysis of content included in the corresponding media content episode includes automatically identifying advertisements in the corresponding media content episode.

14. The method of claim 1, wherein the analysis of content included in the corresponding media content episode includes automatically identifying music in the corresponding media content episode.

15. The method of claim 1, wherein the analysis of content included in the corresponding media content episode includes automatically identifying questions in the corresponding media content episode.

16. The method of claim 1, wherein the recommended media segment is selected from a group consisting of:
an audio segment;
a video segment; and
a highlight video clip.

17. A system, comprising:
one or more processors; and
a memory coupled to the one or more processors, wherein the memory is configured to provide the one or more processors with instructions which when executed cause the one or more processors to perform a set of operations, comprising:
receiving media content episodes;
using machine learning to identify one or more media segments of interest in each of the media content episodes based at least in part on an analysis of content included in a corresponding media content episode, wherein each of the identified media segments is associated with one or more automatically determined tags;
generating a media segment feed for a specific user, including:
using machine learning to automatically select, for the specific user, a recommended media segment from the identified media segments based at least in part on one or more prior user interactions of the specific user with media content episodes and the automatically determined tags of the identified media segments; and
automatically providing the recommended media segment in the media segment feed, wherein:
the one or more prior user interactions of the specific user with media content episodes includes one or more interactions indicating types of content that the specific user is interested in, the one or more interactions selected from the group consisting of:
the specific user listening to a particular media segment to completion;
the specific user sharing the particular media segment with other users of different electronic devices; and
the specific user subscribing to the content corresponding to the particular media segment.

18. The system of claim 17, wherein the one or more prior user interactions of the specific user with media content episodes includes one or more other interactions by the specific user with respective media segments in the media segment feed.

19. The system of claim 17, wherein:
selecting, for the specific user, the recommended media segment from the identified media segments based at least in part on the one or more prior user interactions of the specific user with media content episodes includes identifying types of media content that the specific user is not interested in based on interactions in which the specific user skips or ignores particular media content.

20. A computer program product, the computer program product being embodied in a non-transitory computer readable storage medium and comprising computer instructions for:
receiving media content episodes;
using machine learning to identify one or more media segments of interest in each of the media content episodes based at least in part on an analysis of content included in a corresponding media content episode, wherein each of the identified media segments is associated with one or more automatically determined tags;

generating a media segment feed for a specific user, including:
  using machine learning to automatically select, for the specific user, a recommended media segment from the identified media segments based at least in part on one or more prior user interactions of the specific user with media content episodes and the automatically determined tags of the identified media segments; and
automatically providing the recommended media segment in the media segment feed, wherein:
the one or more prior user interactions of the specific user with media content episodes includes one or more interactions indicating types of content that the specific user is interested in, the one or more interactions selected from the group consisting of:
  the specific user listening to a particular media segment to completion;
  the specific user sharing the particular media segment with other users of different electronic devices; and
  the specific user subscribing to the content corresponding to the particular media segment.

\* \* \* \* \*